United States Patent [19]
Baumann

[11] Patent Number: 5,163,464
[45] Date of Patent: Nov. 17, 1992

[54] PNEUMATIC PRESSURE CONTROLLER

[76] Inventor: Hans D. Baumann, 32 Pine St., Rye, N.H. 03870

[21] Appl. No.: 868,986

[22] Filed: Apr. 15, 1992

[51] Int. Cl.$^5$ ............................................. G05D 16/06
[52] U.S. Cl. ...................................................... 137/85
[58] Field of Search ............................. 137/85, 82, 86

[56] References Cited

U.S. PATENT DOCUMENTS

| | | | |
|---|---|---|---|
| 3,169,402 | 2/1965 | Baker | 137/85 X |
| 3,661,164 | 5/1972 | Kreuter | 137/85 |
| 4,219,042 | 8/1980 | St. Laurent | 137/85 |
| 4,949,754 | 8/1990 | Tamamori | 137/85 X |

*Primary Examiner*—Alan Cohan

[57] ABSTRACT

A motion balanced pneumatic pressure controller comprised of a tubular housing having a diaphragm for sensing a process pressure on one side and a second diaphragm for sensing a pneumatic output signal on the other side; both diaphragms are connected by a stem passing the length of said housing and having valving means attached to open or close a bleed port within the second diaphragm to modulate a pneumatic signal pressure derived from compressed air passing a primary adjustable restriction in direct proportion to the movements of the first diaphragm, such movements being the results of process fluid pressure changes on the first diaphragm being supported by the force of adjustable springs.

4 Claims, 1 Drawing Sheet

PNEUMATIC PRESSURE CONTROLLER

BACKGROUND OF THE INVENTION

This invention relates to pneumatic pressure controllers who, when interacting with separate control valves, are able to control the pressure of fluid in a given piping system.

The objective of my present invention is to provide a very simple and inexpensive pressure controller especially for use in bioprocessing applications where the wetted process side has to not only be aseptic but also be suitable to be periodically cleaned with harsh chemicals but also sterilized with live steam. In addition, the process area has to be self-draining and cannot have any crevices that could support micro-organisms.

An additional requirement is the provision of a double-diaphram on the process side which protects the external environment in case the primary diaphragm sensing the process ruptures.

Finally, my invention shall constitute a very rugged and simple design to withstand external cleaning and vibrations. All these requirements will be met and become clear from the following detailed description.

DETAILED DESCRIPTION OF THE INVENTION

Figure 1:
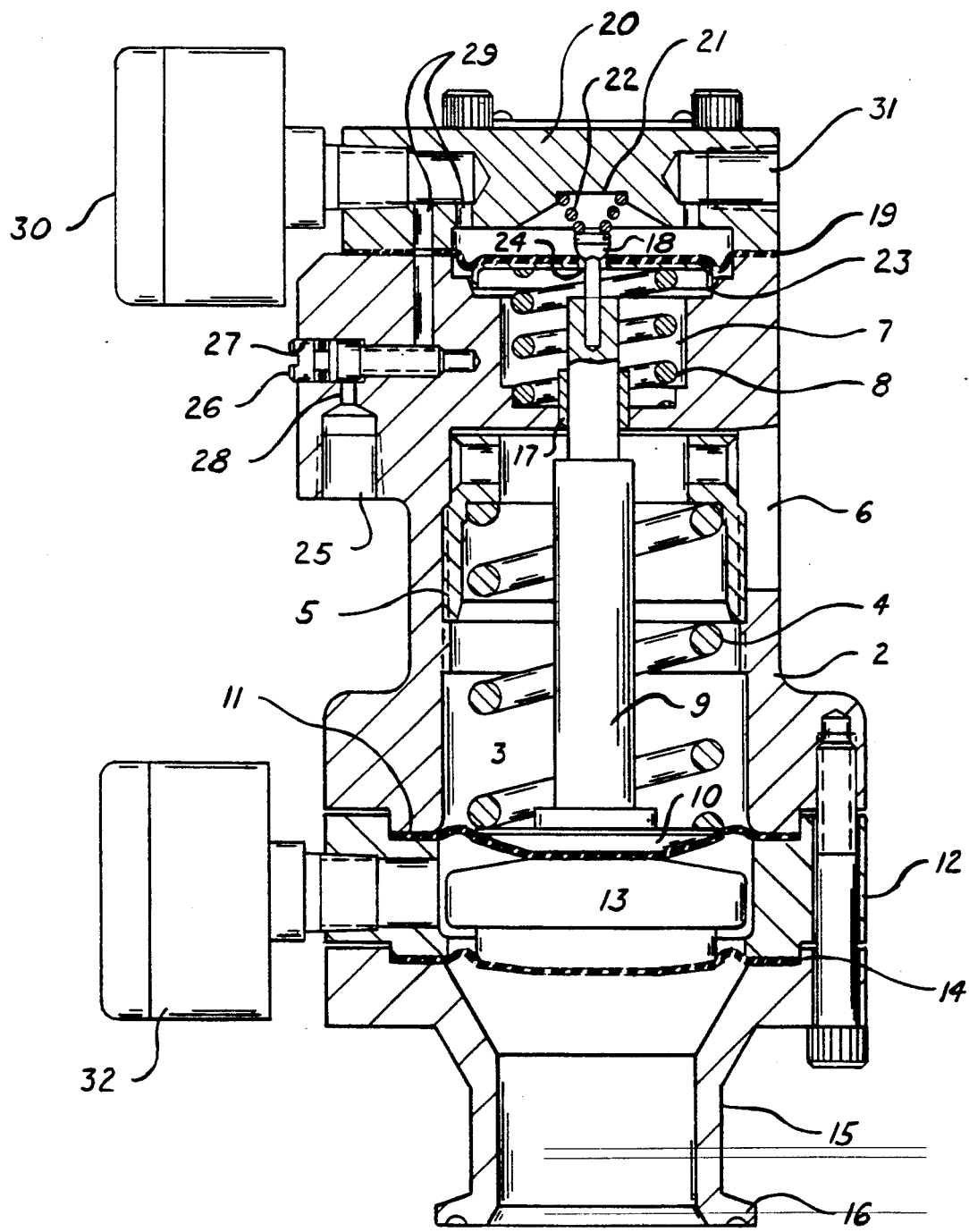
FIG. 1 of the drawing shows a typical configuration of my invention in a central, cross-sectional view.

A typical example of my invention is illustrated in FIG. 1 of the annexed drawing, it is comprised of a housing 2 having a lower, cylindrical opening 3 containing within a coiled compression spring 4 adjustably supported by a threaded spring retainer 5 accessible for rotation by means of an access port 6, and an upper cylindrical opening 7 containing a second coiled compression spring 8.

A stem 9 having a lower, enlarged head portion 10 interfacing with one end of spring 4 and being in contact with a diaphragm 11, the latter being suitably retained between housing 2 and a tubular spacer 12 having within a sliding spacer 13 whose lower extremity is in contact with a second diaphragm 14 which is similarly retained between tubular spacer 13 and an adaptor 15 having lower flange means 16 to attach to a piping system carrying fluid pressure.

The upper extremity of stem 9 is penetrating into the upper body opening 7 while being guided by a bearing 17 and having a recessed opening supporting within a valve plug 18. A feedback diaphragm 19 is clamped between the upper surface of housing 2 and a closure member 20 having a lower, central opening 21 containing within a bias-spring 22 being in contact with valve plug 18. Said diaphragm 19 is supported by a spring button 23, both of which have a central port 24 which acts as an orifice to be covered or uncovered by plug 18.

Furthermore, valve housing 2 has an egress port 25 for compressed air flow in which the rate is controlled by valving means 26 comprising a threaded cylinder 27 capable of selectively blocking air flow through port 28. Said air flow is then conducted through suitable porting 29 into cavity 21 before being allowed to escape through orifice 24 to the atmosphere. The pressure level in cavity 21, constituting a controller signal, is thus proportional to the rate of air flow escaping through orifice 24 once the initial in-flow rate has been established by the proper setting of valving 26. The resultant signal pressure then is measured with the aid of a pressure gage 30 and further conducted to a recording device or control valve via threaded opening 31.

The operation of the invention can be described as follows: Compressed air at a pressure level of 20 PSI is fed to port 25, thereafter passing through valve 26 into cavity 21. Assuming plug 18 is closing orifice 24, then the pressure in cavity 21 will build up to 20 PSI. However, this will not happen since pressure build-up on top of diaphragm 19 will overcome the force of spring 8 leading to a deflection of spring 8 and a down movement of diaphragm 19 thereby uncovering orifice 24. This will lead to a bleed-off of air from cavity 21 until the signal pressure is sufficiently reduced so that the force generated on top of diphargm 19 equals that of spring 8. The pressure in cavity 21 will now remain stable until the force of spring 8 is varied. This happens when stem 9 is motivated up or down as a result of fluid pressure acting on lower diaphragm 14 is increased, for example. The resultant force increase, transmitted through spacer 13 and secondary diaphragm 11 to the head portion 10 of stem 9, is now overcoming the preselected force of spring 4 (as a result of a prior adjustment of retainer 5 through window 6). This now forces stem 9 to move up together with plug 18 which now uncovers orifice 24 leading to a lowering of signal pressure in cavity 21. Spring 8 is now able to push diaphragm 19 up and thereby partially close orifice 24 again to establish a new equilibrium between signal pressure times diaphragm area and the new lower load of spring 8. It can therefore be seen that the signal pressure level in cavity 21 is directly proportional to the change in the process pressure acting on diaphragm 14.

In a typical application, this controller may be used to control steam pressure in a piping system and sensed by diaphragm 14. If there is not enough steam available, then the controlled pressure will drop, leading to an increase in signal pressure in cavity 21 as previously described. This pressure can now be piped via threaded opening 31 to a pneumatic regulating valve having a pneumatic actuator that will open the valve further upon increase in signal, thereby leading to an increase in steam flow to restore the desired system pressure.

Spacer 12 serves to isolate the working portions of my invention from the process fluid in case the primary diaphragm 14 should rupture. Now secondary diaphragm 11 takes over as sensing element while a gage 32 will show a pressure build-up within spacer 12 and thereby indicate a safety problem.

The primary function of valve system 26 is to selectively restrict air flow into cavity 21. If the air flow setting is relatively high, then any valve attached via port 31 can respond faster to meet the pressure requirements of the piping system. On the other hand, a higher air flow does require more relative motion between plug 18 and orifice 24 in order to establish an equilibrium, or force balance with spring 4. This increased motion leads to a certain off-set between the ideal force of spring 4 for the given position of stem 9 and the force, or signal pressure obtained. This difference results in a reduced "gain" of the controller. Thus we have high externally attached valve stroking speed and lower controller gain—an ideal combination. On the other hand, a low air flow setting achieves exactly the opposite. Since it takes longer to build up or reduce air pressure in cavity 21 due to the low volume, any attached valve will respond slower. Likewise, only a small variation in relative position of plug 18 vis-a-vis orifice 24 is required to bring forces into equilibrium; hence a slow valve speed coupled with a high controller gain. The final setting will, of course, be determined by the actual process conditions.

Having thus described the workings of my invention, I claim the following:

1. Pneumatic pressure controller comprising a housing having a central, longitudinal bore throughout; diaphragms attached to each terminating end of said housing; said housing having an upper and one lower enlarged cavity on the respective end of said housing and being co-axial with said bore, and where each cavity has one or more compression spring capable of exerting a force onto each respective diaphragm to counteract fluid pressure acting on that side of each diaphragm facing away from the springs; flange means suitably fastened to each end of said housing and capable of retaining said diaphragms and to conduct an external process fluid pressure towards the diaphragm covering the lower cavity and to conduct a pneumatic signal pressure towards the diaphragm covering the upper cavity, said upper diaphragm having a central port, a stem suitably guided in said longitudinal bore and capable of sensing the motion of the lower cavity diaphragm while supporting a pilot valve at its upper end capable of cooperating with the central port of the upper diaphragm in such a manner that whenever the stem moves upwards as a result of increased process fluid pressure being exerted on the lower diaphragm, the central port is uncovered and a pneumatic signal pressure is lowered caused by leakage flow from the area above the upper cavity diaphragm through said open port, said housing further comprising of a pneumatic signal port and having suitable passages to conduct pneumatic signal fluid such as compressed air to the upper cavity diaphragm, a restrictive opening being part of said passage for the signal fluid and being capable of restricting the flow of signal fluid to a level below that which may pass through the control port of the upper diaphragm once exposed by said pilot valve.

2. A pneumatic pressure controller as described in claim 1, wherein said flange means covering the lower housing cavity has a central opening containing spacer means, a lower terminating end, additional retaining means suitably fastened to the lower, terminating end of said flange means and capable of retaining at least one additional diaphragm and wherein the additional retaining means are configured to conduct a process fluid pressure to said additional diaphragm.

3. A pneumatic pressure controller as described in claim 1, wherein said lower cavity of the housing also retains means to adjust the compression of the spring exerting a force onto the lower diaphragm.

4. A pneumatic pressure controller as described in claim 1, wherein said restricted opening in the passage that conducts pneumatic signal fluid comprises a valve threadingly engaged in a portion of said housing and having a thickened non-threaded portion capable of blocking signal fluid flow towards the upper diaphragm.

* * * * *